US009292553B2

(12) United States Patent
Brand

(10) Patent No.: US 9,292,553 B2
(45) Date of Patent: Mar. 22, 2016

(54) QUERIES FOR THIN DATABASE INDEXING

(71) Applicant: Pivotal Software, Inc., Palo Alto, CA (US)

(72) Inventor: Michael Brand, Bentleigh East (AU)

(73) Assignee: Pivotal Software, Inc., Palo Alto, CA (US)

( * ) Notice: Subject to any disclaimer, the term of this patent is extended or adjusted under 35 U.S.C. 154(b) by 192 days.

(21) Appl. No.: 13/971,735

(22) Filed: Aug. 20, 2013

(65) Prior Publication Data

US 2015/0058351 A1   Feb. 26, 2015

(51) Int. Cl.
*G06F 7/02* (2006.01)
*G06F 17/30* (2006.01)

(52) U.S. Cl.
CPC .... *G06F 17/30321* (2013.01); *G06F 17/30312* (2013.01); *G06F 17/30315* (2013.01); *G06F 17/30336* (2013.01); *G06F 17/30613* (2013.01)

(58) Field of Classification Search
CPC ............... G06F 17/30336; G06F 17/30321; G06F 17/30312; G06F 17/30; G06F 17/30613
See application file for complete search history.

(56) References Cited

U.S. PATENT DOCUMENTS

| | | | | |
|---|---|---|---|---|
| 5,848,410 A | * | 12/1998 | Walls et al. | |
| 6,009,432 A | * | 12/1999 | Tarin | G06F 17/30592 |
| 6,112,209 A | * | 8/2000 | Gusack | |
| 7,136,861 B1 | * | 11/2006 | Sinclair | G06F 17/3033 |
| 2003/0050925 A1 | * | 3/2003 | Moskovich et al. | 707/3 |
| 2009/0222408 A1 | | 9/2009 | Denis et al. | |
| 2014/0114968 A1 | * | 4/2014 | Anderson | 707/732 |

OTHER PUBLICATIONS

Hellman, "A Cryptanalytic Time-Memory Trade-Off," IEEE Transactions on Information Theory, Jul. 1980, 26(4):401-406.
International Search Report and Written Opinion in International Application No. PCT/US2014/051901, mailed on Nov. 25, 2014, 11 pages.

\* cited by examiner

*Primary Examiner* — Bruce Moser
(74) *Attorney, Agent, or Firm* — Fish & Richardson P.C.

(57) ABSTRACT

A method of database indexing is disclosed. Two functions (f and g) from row values to row number values are set. The functions are utilized to determine a row number in a database column containing a target search value, wherein the target search value comprises a search value being sought in the database column. A candidate row number variable is set initially to the function g of the target search value by a processor. Iteratively the following is performed: a current value of the candidate row number variable is used as an address to read a value in a corresponding row in the database column, and the current value of the candidate row number variable is updated to the function f of the most recently read value in a corresponding row in the database column.

39 Claims, 9 Drawing Sheets

600

```
   // The technique uses an array, "memory", of length
S.
   // The goal is to find a value x, such that
f(x)=pos.

orig = i = pos
   counter=0
   while
((counter<S)&&(i>L)&&((counter==0)||(i!=orig))) {
     memory[counter]=i
     i=f(i)
     ++counter;
   }
   if ((counter>0)&&(i==orig)) {
     return memory[counter-1]
   } else if (i<=L) {
     i=shortcut(i)
   } else {
     for(counter=0;(counter<K);++counter) {
       pos=find memory[counter] in exceptions
       if found: break
     }
     i=pointer stored in exceptions[pos]
   }
   x=i
   while (i!=orig) {
     x=i
     i=f(i)
   }
   return x
```

FIG. 6

| 700 | 1 | 2 | 3 | 4 | 5 | ... | N |
|---|---|---|---|---|---|---|---|
| | 39 | 40 | 40 | 40 | 41 | ... | 98 |

FIG. 7A

| 710 | 1 | 4 | 5 | ... | N |
|---|---|---|---|---|---|
| | 39 | 40 | 41 | ... | 98 |

FIG. 7B

QUERIES FOR THIN DATABASE INDEXING

BACKGROUND OF THE INVENTION

In Big Data applications, the data sets are so large and complex that traditional database management techniques become impractical. It would be desirable to develop database techniques for handling Big Data.

BRIEF DESCRIPTION OF THE DRAWINGS

Various embodiments of the invention are disclosed in the following detailed description and the accompanying drawings.

FIG. 6 illustrates an embodiment of a process 600 for retrieving the address in which a particular column value resides using thin database indexing techniques.

FIG. 7A illustrates an embodiment of a conversion table 700 for converting an original set of column data (e.g., temperature data) into a permutation, and vice versa.

FIG. 7B illustrates an embodiment of a conversion table 710 embodying the same information as conversion table 700.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
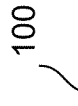
FIG. 1 illustrates an embodiment of a database table 100.

Databases typically keep their data in tables. FIG. 1 illustrates an embodiment of a database table 100. The data in database table 100 may represent anything: sales figures, electricity usage, distance driven, and the like, and the data may be represented in the database in any chosen unit. Typically, each column represents data from a single type (e.g., 'Bob's sales figures') and each row represents data that are logically associated with a single entity (e.g. 'Information about a particular year'). For example, the '1001' datum in FIG. 1 may reflect Bob's sales figures during 1982. Typically, database tables include a handful of columns, but the number of rows may be very large: in Big Data applications, tables may have $10^{12}$ to $10^{15}$ rows.

Two common types of queries regarding table data are value queries and range queries. Examples of value queries are "print out the rows where the value of the 'year' column is 1982" and "print out the rows where the value of the 'Ann' column is 957;" examples of range queries are "print out the rows where the value of the 'year' column is between 1982 and 1992" and "print out the rows where the value of the 'Ann' column is between 800 and 1000." Both kinds of queries may return zero, one, or multiple rows.

One way to retrieve the answers to such queries is by sequentially scanning the entire set of data in the table. However, for a table with many rows, this way of retrieving the answers may be prohibitively slow. An alternate solution is to keep the data sorted. For example, the data in database table 100 is sorted by year, and hence a range query example "print out the rows where the value of the 'year' column is between 1982 and 1992" given above can be performed by quickly finding the first and the last relevant rows (e.g., by a binary-searching process). Once the first and the last relevant rows are found, the results of the query can be given by reading out all relevant rows within the range.

If the database has N rows and the query is to return n out of N rows, then a query of an unsorted table performs the task in a time proportional to N (denoted as $\Theta(N)$ time in the notation of computational complexity). In contrast, retrieval from a sorted table can be done far more efficiently, in only $\Theta(n+\log N)$ time; the "log N" component is the time it takes to find the first and last relevant rows, and the "n" component is the time it takes to read out the data. Because the "n" component is inherent in returning a result, without loss of generality it can be ignored and the "log N" component is referred to as the overhead of the query. Therefore, querying an unsorted table incurs an $\Theta(N)$-time overhead, whereas a sorted table has a substantially lower $\Theta(\log N)$-time overhead.

The sorting solution introduces its own problem: by sorting the data according to one column (the 'year' column of the previous example), the data becomes unsorted for all other columns. For example, the range query example "print out the rows where the value of the 'Ann' column is between 800 and 1000" given above cannot be solved in the same manner.

One solution to this problem is data replication. However, data replication can be prohibitively expensive when the databases store large quantities of data.

Figure 2:
FIG. 2 illustrates an embodiment of an index 200 for the column "Ann."

An alternate solution is indexing. An index is, conceptually, a table that includes two columns. One column replicates data from the original table, but the data is sorted. The other column stores pointers into the original table. Pointers are data elements that provide information regarding a particular data location (often referred to as an address). Addresses are numbers, but are often depicted in schematic drawings by arrows. When used to address rows in a table, addresses can be thought of as row numbers. Given a particular row number, retrieval of that row can be performed in a constant time independent of N. Pointers permit the logical replication of the entire table in the new format, while physically requiring much less space. FIG. 2 illustrates an embodiment of an index 200 for the column "Ann."

Given index 200, the range query "print out the rows where the value of the 'Ann' column is between 800 and 1000" can be resolved in $\Theta(\log N)$-time overhead, by first performing the query on index 200, thus retrieving a list of pointers (row numbers), then using this list to retrieve the original table data from database table 100.

In real world applications, database tables may have many columns that are queried frequently. Therefore, multiple indexes need to be built for each table. As an example, suppose that a table with $N \approx 10^{15}$ rows and c columns needs to be indexed for every column. Suppose further that each column datum is an integer that can be stored in 4 bytes. The amount of space required to keep all the table's information is 4*N*c bytes. Storing the indexes, however, requires substantially more space. A pointer capable of addressing a table of this size will have to be fractionally more than 6 bytes in size. In practical implementation terms, this means that it will be 8 bytes long. Thus, a single index row requires 12 bytes. The total space spent on indexes is therefore 12*N*c bytes, or 3 times more than the original table data, for a total of quadrupled disk-space requirement.

For conventional databases, this cost of extra space may be acceptable. However, in Big Data applications, the cost of indexes is not merely storage space cost: an even more substantial cost associated with indexes is the read/write time cost.

A database holding $N \approx 10^{15}$ rows is generally split over many disks. Furthermore, each index is necessarily split over many disks. This has two basic costs. Each disk can be either in an 'up' or a 'down' state, and the disk data can only be accessed when it is up. Spinning a disk up or down takes an amount of time more substantial than any of the other time-costs mentioned so far. Binary searching over the index data may require access to only $\Theta(\log N)$ index rows, but it becomes a costly process if the rows are spread across many different disks, requiring $\Theta(\log N)$ disks to be spun up and down for the index seeks.

Furthermore, after finding the relevant start and end of the relevant data on the index, this data contains pointers determining the address to the actual data to be retrieved. The data in the tables is unsorted. Typically, n may be small compared to N, such that each row is likely to be in a different disk. Hence, the process requires $\Theta(n)$ disk up-down actions.

In some other techniques, the index is split into several indexes: a primary index gives the identity of the disk on which the data is to be found, and secondary indexes exist in each disk, indexing only the data that resides in their local disk. In terms of disk up-down actions, this is still $\Theta(\log N)$ for the search through the primary index, but the subsequent secondary index search is $\Theta(n)$.

This solution has several drawbacks: it requires a large number of disk up-down actions (totaling $\Theta(\log N+n)$) and a large amount of space to store the indexes. The need to store indexes in the same disk as the data exacerbates the disk space problem, by reducing the amount of data that can be stored on each disk and increasing the degree of data fragmentation.

In applications such as Big Data, N may be so large that both of the costs become too high for the solution to be practicable. One technique for reducing data fragmentation is to simply omit the secondary indexes. But in doing so, the seek time to find each data element increases significantly. For example, if a disk can store K data rows, then the cost increases from $\Theta(\log K)$ disk searches per query and one more per element to be retrieved from the disk (in the case of indexed searches) to a full $\Theta(K)$-time disk scan (in the case of no secondary indexes).

Figure 3:
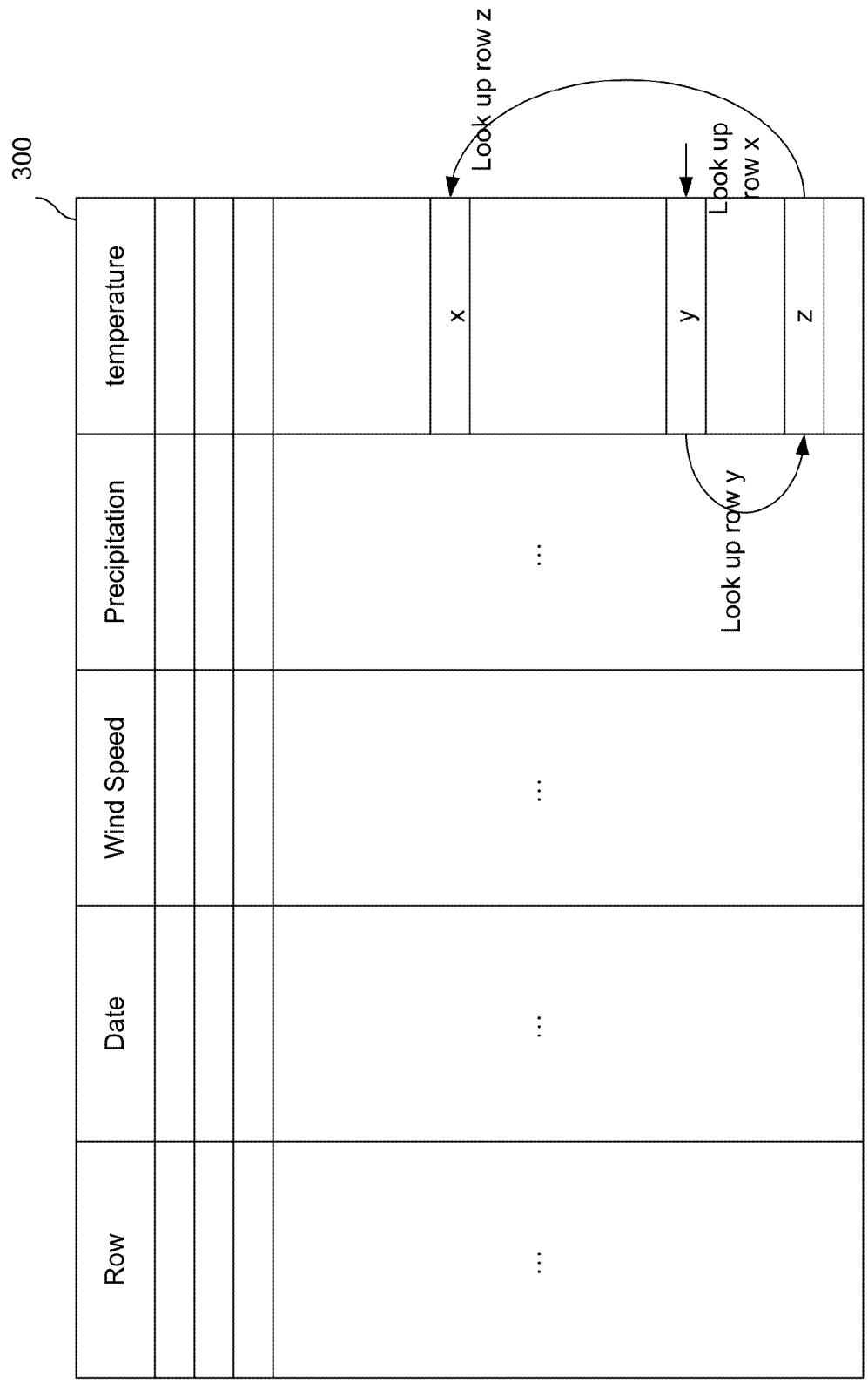
FIG. 3 illustrates an embodiment of a database table 300 using thin database indexing techniques.

FIG. 3 illustrates an embodiment of a database table 300 using thin database indexing techniques. The indexing techniques are thin in the sense that most of the storage area is used for table data, with minimal indexing overhead. Mathematically, if looking up a column value with a row number is represented by the function f( ), then the function of finding the row number corresponding to a column value is the function $f^{-1}( )$ the inverse of the function f( ). In a database query, a range of row values is indicated, and the inverse function $f^{-1}( )$ is used to retrieve the row numbers in which the range of row values can be found. It can be shown that a database query using thin database indexing requires only $\Theta(n)$ disks to be spun up and down.

In one example, database table 300 may be used to store the weather information of a city. As shown in FIG. 3, database table 300 includes a number of columns of data, including columns for the date, wind speed, precipitation, and temperature of the city, and each column of data has a number of rows. For each column, the data is encoded as a cyclic structure such that the row number in which a particular encoded value is stored can be obtained by using the particular encoded value as an address to look up the stored encoded value at that address, then using the stored encoded value again as an address to look up the next stored encoded value, and repeating this look-up process until finally the particular encoded value is found in a particular row of database table 300. The particular row of database table 300 is then read out from database table 300 to retrieve the various columns of data in that row. More specifically, referring to FIG. 3, suppose that a user wishes to retrieve the information in a row in which the encoded temperature is x. x is the target search value. x is used as an address (also referred to as a candidate row number) to look up the stored encoded value y in row x of the temperature column, and then y is used as an address to look up the stored encoded value z in row y, and then z is again used as an address to look up the stored encoded value in row z. Since the stored encoded temperature value in row z is equal to x, i.e., the encoded temperature value that the user is searching for, it is determined that z is the target row number and that row z is the row of information that should be retrieved from database table 300.

In some embodiments, functions may be used to convert row values to row number values. Similar to the example as shown in FIG. 3, a function g may be used to convert x, the target search value, into a row number value to look up the stored encoded value in that row of the temperature column. A function f may be used to convert the stored encoded value in that row of the temperature column into a row number value to look up the next stored encoded value. The function f is an invertible function, i.e., for every row number value, b, there is exactly one row value, a, such that f(a)=b.

Data in each column of database table 300 can be encoded using different techniques such that the row number of a searched column value can be determined by walking through the database in a cyclic manner as described above. For example, the data in a column of database table 300 may be encoded as a permutation: the encoded data in the column includes the numbers 1 through N, occurring in any order in the column, with each number appearing exactly once. As an illustrative example for describing the thin database indexing techniques, the data in each column of database table 300 is hereinafter assumed to be encoded as a permutation. However, those skilled in the art should realize that the techniques disclosed in the present application are not only limited to this particular illustrative example.

Data in each column of database table 300 encoded as a permutation enables a row number of a searched column value to be determined by walking through the database in a cyclic manner as described above, because a permutation, P(x), has a cyclic structure. Beginning from an element x, and repeatedly calculating P(x), P(P(x)), P(P(P(x))), and so forth, will eventually return a result that is equal to x, completing a cycle.

Figure 4B:
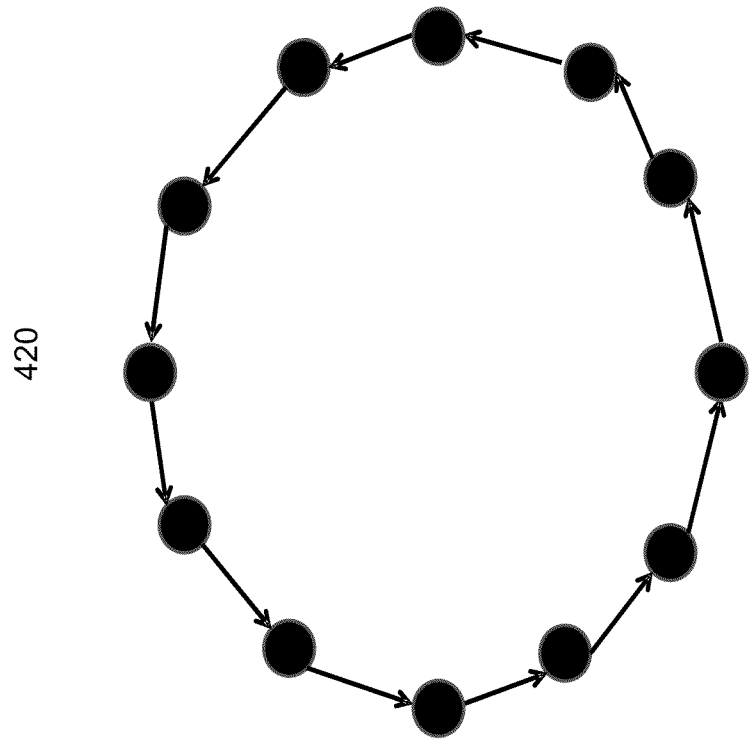
FIG. 4B illustrates an embodiment of a longer cycle 420 out of the permutation cyclic structure.
Figure 4A:
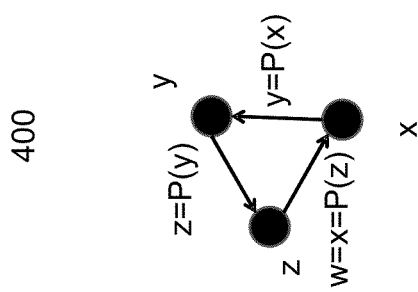
FIG. 4A illustrates an embodiment of a shorter cycle 400 out of a permutation cyclic structure.

FIG. 4A and FIG. 4B illustrate an embodiment of a shorter cycle 400 out of a permutation cyclic structure and an embodiment of a longer cycle 420 out of the permutation cyclic structure, respectively. Cycle 400 is shorter, with 3 elements only. Cycle 420 is longer, with 12 elements. The elements are depicted by the circles. The permutation function (i.e., f(x)=P(x)) is represented by the solid arrows. An arrow leads from any element x to P(x). In terms of required storage space, no extraneous information is needed to be stored in order to calculate P(x). To calculate P(x), the column value that is stored in row x is looked up from the table. To calculate P(P(x)), the value that is stored in row=P(x) is looked up from the table. By repeating this process, i.e., P(x), P(P(x)), P(. . . P(P(P(x)))), the entire cycle of the permutation can be traced. For example, in cycle 400 of length 3 depicted in FIG. 4A, the entire cycle is traced by starting at an element x, and then calculating y=P(x), z=P(y), and w=P(z). Detecting that the entire cycle has been traced can be accomplished by checking whether w is equal to x. In the example of FIG. 4A, w is equal to x; therefore, x=P(z), and z=$P^{-1}$(x). In other words, x can be found to be stored in row z with just three look-ups. Unfortunately, if the permutation P(x) is a random permutation (uniformly chosen from all possible permutations), then most elements belong to long cycles, such as cycle 420 or cycles with more elements than cycle 420, requiring more look-ups into the column before the row number in which a column value is resided can be determined.

Figure 5:
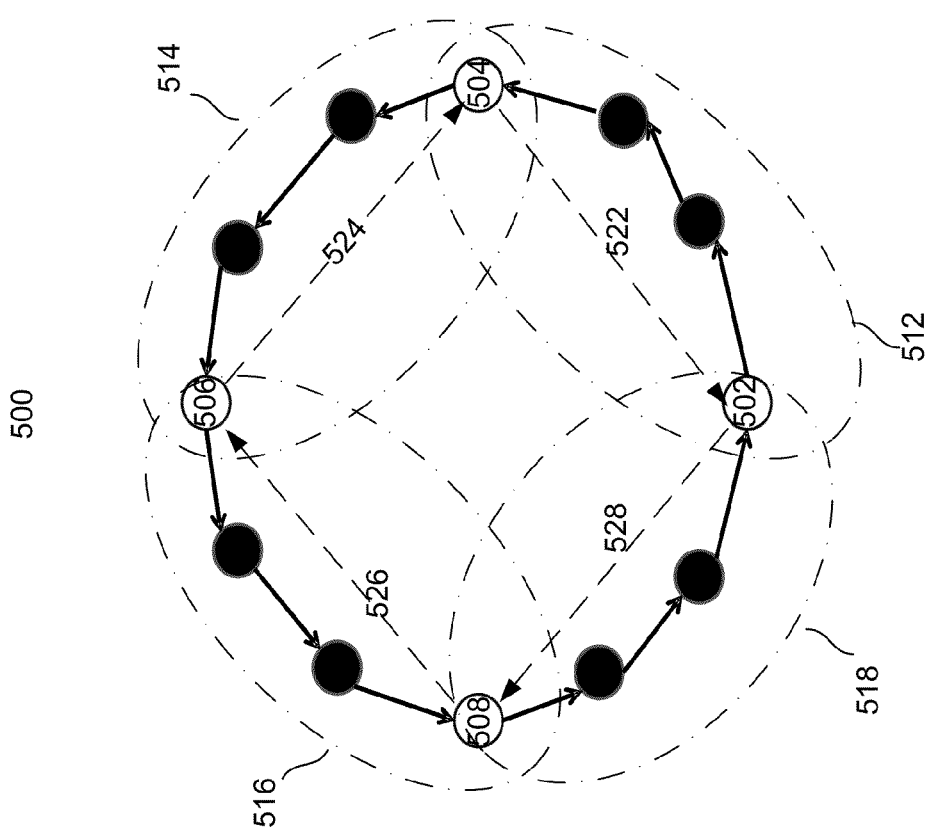
FIG. 5 illustrates an embodiment of a cycle 500.

In some embodiments, the number of required look-ups can be reduced by splitting longer cycles into a plurality of shorter cycles. The cyclic structure of a random permutation is known: on average, the proportion of cycles with potential cycle length k will be 1/k. Also, in each cycle of length k, an average of kL/N of the elements will have a value in the range $1 \le x \le L$, for arbitrary L, and these elements will be distributed uniformly among the elements of the cycle, for an average of N/L between any two consecutive ones. Considering the above, elements within the range 1 to L (hereinafter referred to as the special elements) should appear in random locations within the permutation cycles. For example, if cycle 500 is a cycle of a random permutation, then the special elements (502, 504, 506, and 508) are distributed randomly within the cycle, as indicated by the hollow circles in FIG. 5. Cycle 500 can be split into a plurality of sub-cycles—sub-cycles 512, 514, 516, and 518 of length 4 each—by including for each special element a pointer to the preceding special element. A pointer from each indexed element to its predecessor is referred to as a shortcut. In FIG. 5, the shortcuts are indicated as dashed arrows. The inverse of the permutation function ($f^{-1}$()=$P^{-1}$()) is computed by following the original cycle, but following the shortcuts whenever they are available. For example, special element 504 is indexed by adding a shortcut 522 from special element 504 to the preceding special element 502. For elements belonging to sub-cycle 512, the inverse of the permutation function is obtained by following the original cycle 500, but following shortcut 522 from special element 504 to special element 502, through a total of four pointers only. As shown above, thin database indexing requires storage for only a small number (L) of values. In addition, these values are relatively small in size, being only in the range $1 \le x \le L$ and not in the full range $1 \le x \le N$, thus requiring fewer bits to store the information.

In some embodiments, additional shortcuts are included for further shortening of the cycle lengths. As described above, the L indexed special elements are randomly distributed in a cycle. Therefore, statistically, some of the indexed special elements may potentially be spaced much further apart from their corresponding predecessor special elements than the average. In these cases, the sub-cycle length is longer, thus requiring the traversal of more elements/pointers before the inverse of the permutation function can be obtained. Thus, elements with shortcuts are added in any stretch longer than S that does not include any indexed elements, referred to as exception elements. In some embodiments, the extra shortcuts associated with the exception elements are stored in a separate table (referred to as an exceptions table), holding the information of both the original element number and the address to which its shortcut leads. In some embodiments, the table is sorted by the element number for easy retrieval.

FIG. 6 illustrates an embodiment of a process 600 for retrieving the address in which a particular column value resides using thin database indexing techniques. Process 600 has two characteristics:

1) Any element that is in the range $1 \le x \le L$ has a shortcut.
2) There is a shortcut (for a special element or an exception element) spaced at most every S elements apart.

In the worst-case scenario, each element is retrieved by going through a cycle of length S and performing for each element in the cycle a lookup into the exceptions table. However, the exceptions table is relatively small and can easily fit within a single disk. The heavy part of the computation is S*n row reads, each of which may reside in a different disk, for a total of S*n disk up-down operations. Thus, for a reasonably-sized S, the number of disk up-down operations is far lower than other techniques, where the number of such operations may be related to N.

Figures 7A, 7B:
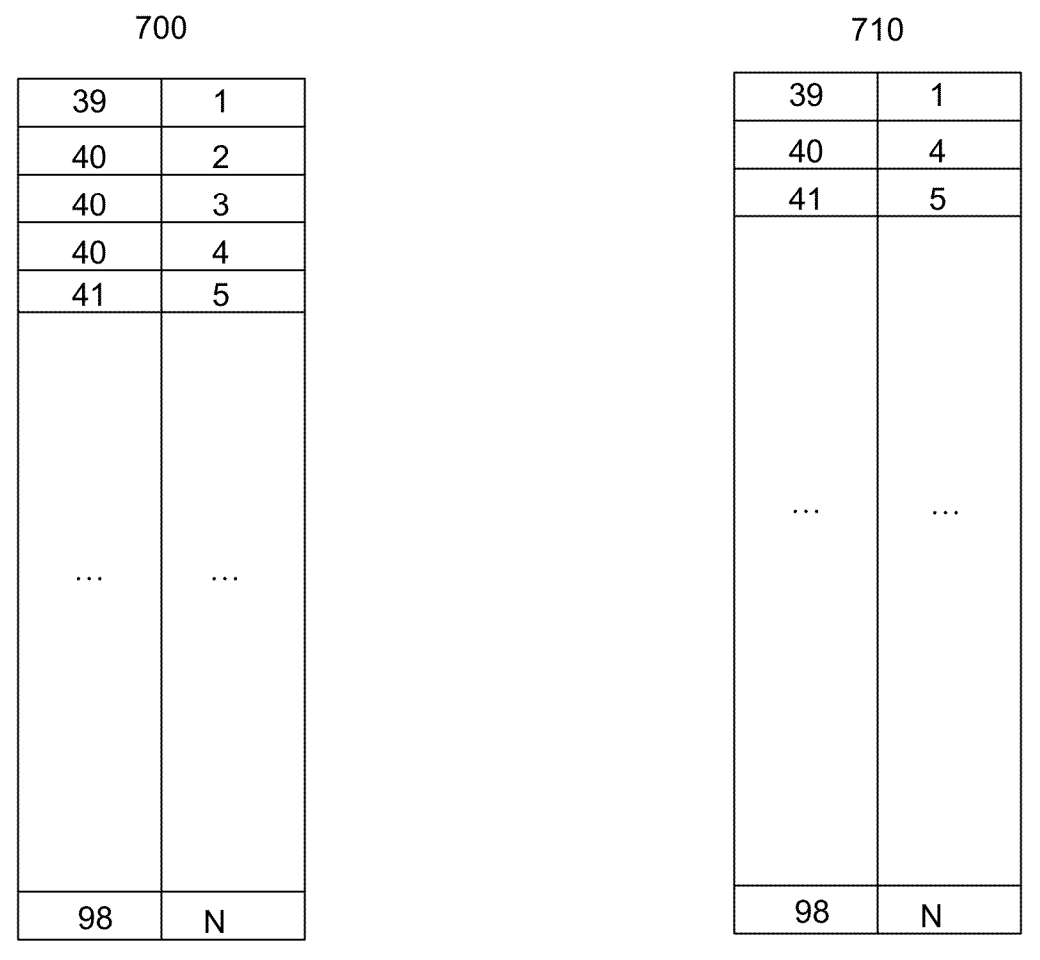

Referring back to FIG. 3, each of the columns of database table 300 is encoded as a permutation: the encoded data in the column includes the numbers 1 through N, which can occur in any order, with each number appearing exactly once. FIG. 7A illustrates an embodiment of a conversion table 700 for converting an original set of column data (e.g., temperature data) into a permutation, and vice versa. Conversion table 700 includes two columns. The left column stores the original set of column data that is sorted from the lowest value to the highest value. The right column stores the encoded column data, with 1 corresponding to the lowest value and N corresponding to the highest value. For example, as shown in FIG. 7A, as 39 degrees Fahrenheit is the lowest temperature, its encoded value stored in the right column is 1. The second lowest temperature, 40 degrees Fahrenheit is encoded in the right column as 2. Because there are multiple entries with 40 degrees Fahrenheit, these entries are encoded as 2, 3, and 4 in the right column. The highest temperature, 98 degrees Fahrenheit is encoded in the right column as N.

Conversion table 700 has columns that are sorted. In some embodiments, conversion table 700 can be stored in more memory efficient data structures. FIG. 7B illustrates the preferred embodiment of a conversion table 710 embodying the same information as conversion table 700. Conversion table 710 includes two columns. The left column stores the original set of column data that is sorted from the lowest value to the highest value. The right column stores the running count of the number of data entries with values<=the current entry. For example, as shown in FIG. 7B, as 39 degrees Fahrenheit is the lowest temperature and has only one occurrence, the running count in the right column is 1. The second lowest temperature, 40 degrees Fahrenheit, has 3 occurrences, and thus the running count in the right column is 4. If the original data is 32 bits long, for example, then a table of size $2^{32}$ entries may be used to keep a count of the number of data entries with values less than or equal to the current entry. This conversion table requires approximately 32 Gigabytes to store, considerably less than the memory required to store the original column of length $N=10^{12}$ to $10^{15}$ for Big data applications. Furthermore, this table can be made even smaller by utilizing compression techniques such as delta encoding. The resultant storage requirement of the conversion table is negligible compared to the total table data. Traditional indexing techniques require storing a pointer in addition to the data element. In comparison, the thin database indexing techniques require storage size that is only slightly more than the maximum between the size of the pointer and the size of the data to be stored.

In another embodiment, a conversion table that stores the number of occurrences for each and every data value can be used. For example, if the original data is 32 bits long, then a table of size $2^{32}$ entries may be used to keep a count of the number of data entries with values equal to the current entry. A person of ordinary skill in the art will recognize that many other ways of implementing the conversion tables are possible.

Figure 8:
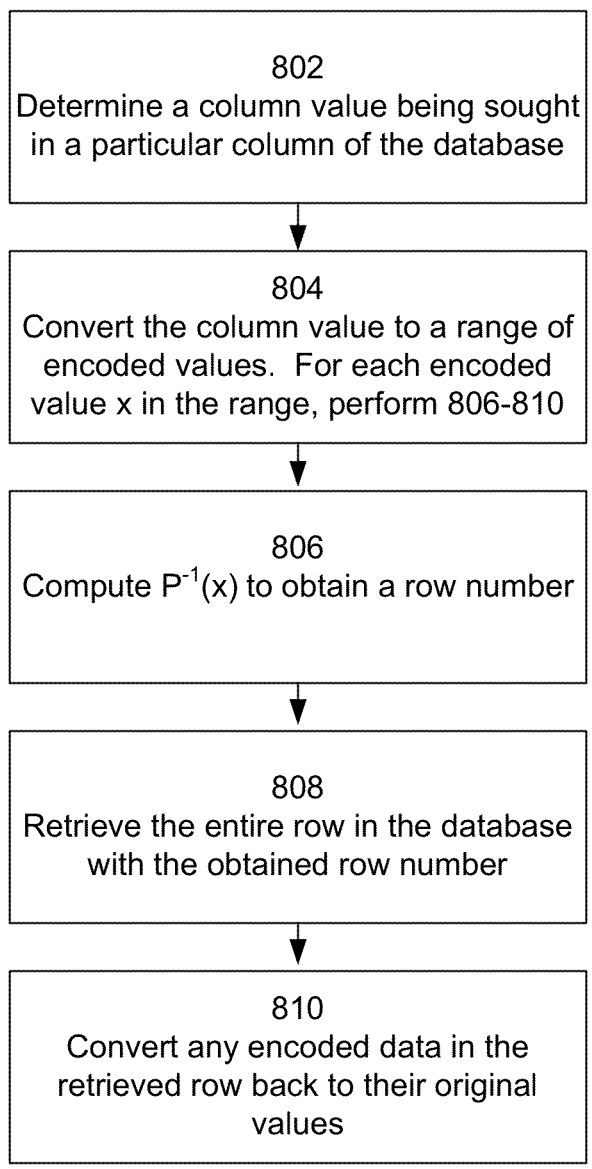
FIG. 8 illustrates an embodiment of a flow chart 800 for a value query.

FIG. 8 illustrates an embodiment of a flow chart 800 for a value query. For example, a value query may be "print out the rows where the value of the 'temperature' column is 40 degrees Fahrenheit." At 802, the column value being sought in a particular column of the database is determined. For the example value query given above, the column value being sought is 40 degrees Fahrenheit. At 804, the column value is converted to its encoded value. Continuing with the example above and using the conversion table 700 in FIG. 7A, the encoded value x can be 2, 3, or 4. In the scenario wherein the column value repeats, such that more than one encoded value is possible, then the subsequent steps 806, 808 and 810 are iterated for each of the possible encoded values. In the forgoing example, steps 806, 808 and 810 are repeated for x=2, 3 and 4. At 806, $P^{-1}(x)$ is computed to obtain the row number in which the encoded column value resides. The value x is used as an address to look up the stored encoded temperature value y in row x of the encoded temperature column, and then y is used as an address to look up the stored encoded temperature value z in row y, and so on until the encoded value x is found. The row number in which the encoded value x is found is the row of information to be retrieved. At 808, the entire row of information is retrieved from database table 300 using the obtained row number. At 810, any data in the retrieved row which have been encoded are converted back to their original values using their corresponding conversion tables. This conversion need only be performed on data columns that have been thin-indexed (and are therefore stored as permutations). If the data column which is the subject of the query (temperature in the foregoing example) is the only data column that has been thin-indexed in the table, then the conversion can be performed by simply reading the stored value of the query.

A range query may be generally described as "find all rows where the values of the search column lie between the column values t_1 and t_n." A range query can be derived from a value query by generalizing "column value" in 802 and 804 to a "range of column values". Specifically, a range query can be implemented by looking up the conversion table corresponding to the search column to find x_1 and x_n, the first encoded value corresponding to column value t_1 and the last encoded value corresponding to column value t_n, respectively. The conversion table is sorted, and hence the encoded values starting from x_1 and ending at x_n form the range of encoded values that fall within the range query. The range query can then be implemented by performing steps 806, 808 and 810 for each encoded value within the range.

In some embodiments, the encoded column values encoded as a permutation may be further processed such that the permutation becomes a random permutation. In order to ensure that performance is unaffected by the statistics of the table data, the permutation is decoupled from the original data. To do this, instead of working with the original permutation, f, a new permutation is formed, $g(x)=f(h(x))$, where h is a permutation chosen randomly (but in a way that is easy to store and calculate. For example, just choosing a random r and returning $h(x)=x+r$ modulo N is already enough to ensure that for any specific x, g(x) is random and uniformly chosen). A person of ordinary skill in the art will recognize that other randomization schemes are possible. The new permutation, g, has the necessary randomness properties regardless off By inverting g, a value is found, y, such that $g(y)=x$. This means that $f(h(y))=x$, so h(y) is the solution to the problem of finding $f^{-1}(x)$.

The special elements, exception elements, and the shortcuts associated with these elements may be identified and created using different techniques. In one embodiment, an entire permutation cycle is traversed to determine the special elements and exception elements, and then their corresponding shortcuts are created. Building the index can be performed by following the cycles. A single pass over the data suffices. However, the pass is not a sequential pass, and thus it includes N random reads, with N disk spin-ups. Instead of following an entire cycle, the cycle may be broken down into fragments f2, f4, f8, and so forth. This can be done in a few (sequential) passes over the data, which can be fully parallelized (e.g., in map-reduce type algorithms).

Figure 9:
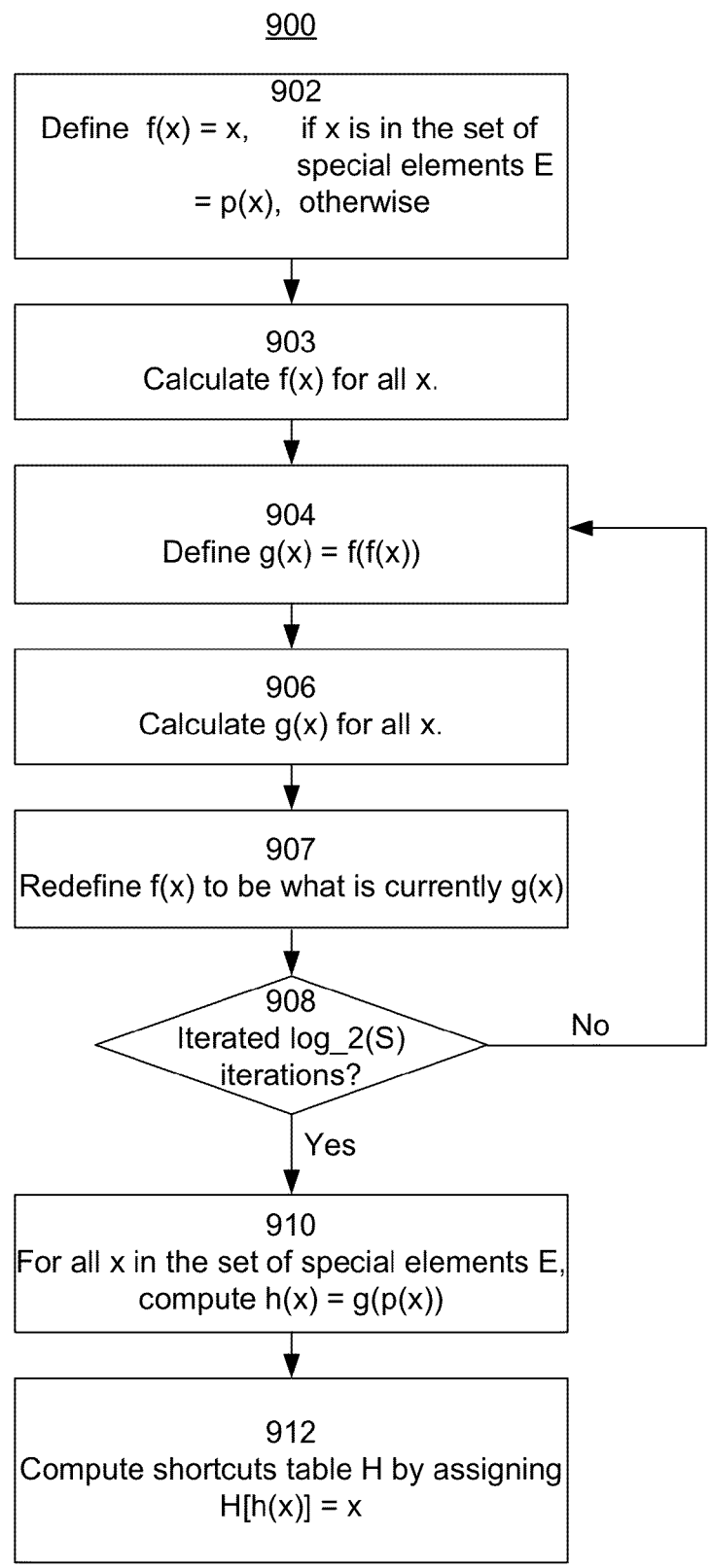
FIG. 9 illustrates an embodiment of a process 900 for constructing a table of shortcuts, H.

FIG. 9 illustrates an embodiment of a process 900 for constructing a table of shortcuts, H. At 902, function f(x) is defined to be equal to x, if x belongs to E, the set of special elements; otherwise f(x) is defined to be p(x), where p is the permutation function. At 903, function f(x) is computed for all values of x. At 904, function g(x) is defined to be f(f(x)). At 906, g(x) is computed for all values of x. At 907, f(x) is redefined to be what is currently g(x). 904 through 907 are then iterated for $\log_2(S)$ iterations. At 910, h(x) is computed to be equal to g(p(x)) for all x in the set of special elements E. At 912, the shortcuts table H is filled by assigning $H(h(x))=x$. Process 900 is more efficient than traversing an entire permutation cycle. For example, steps 903, 906, 908, and 910 may be fully parallelized. These steps can thus take advantage of massively multi-parallel architectures. Distributed file systems (e.g., Hadoop MapReduce) and in-database techniques may be used.

In some embodiments, each disk's contents are indexed separately. When retrieving, the first step is to use the conversion table in order to translate the query into a range of permutation elements. After this first step, the number of results that will be returned from each disk is known. If all conversion tables are placed on a single disk (or a few disks), then the disks can be scanned quickly, without introducing extraneous disk spin-ups. At the end of this scan, the identities of which disks contain relevant elements are known, and only those disks need to be loaded. The use of the indexing method described still calls for random accesses, but these random accesses are within a single disk. In some embodiments, this process can be parallelized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of finding data in a database, comprising:
    determining a row number in a database of a row that has a column that contains a target search value, wherein the target search value comprises a search value being sought in the database column, comprising:
        determining an initial candidate row number from the target search value by a processor,
        iteratively determining a subsequent candidate row number from a current candidate row number until the row of the database having the subsequent candidate row number has an encoded column value matching the initial candidate row number, including:
            determining whether an encoded column value in the current candidate row number of the database column corresponds to a special element of a plurality of special elements,
            if the encoded column value in the current candidate row number of the database column does not correspond to a special element, updating the current candidate row number by applying a permutation function f to the encoded column value in the current candidate row number in the database column, wherein the permutation function f converts row numbers to encoded column values, and
            if the encoded column value in the current candidate row number of the database column corresponds to a special element, updating the current candidate row number to a subsequent candidate row number associated with the special element instead of updating the current candidate row number using the permutation function f; and
        providing the subsequent candidate row number having the encoded column value matching the initial candidate row number.

2. The method of claim 1, wherein the permutation function f is an invertible function.

3. The method of claim 1, wherein determining the initial candidate row number comprises applying a function g to the target search value, wherein the function g converts target search values to initial candidate row numbers.

4. The method of claim 1, wherein applying the permutation function f to a row number generates a subsequent value of a permutation cycle.

5. The method of claim 1, wherein applying the permutation function f to a row number can be performed in memory without accessing other database content.

6. The method of claim 1, further comprising:
    receiving a request for row information having the target search value; and
    wherein providing the current candidate row number having the encoded column value matching the initial candidate row number is performed in response to receiving the request.

7. The method of claim 1, further comprising generating the special elements in a permutation cycle defined by the permutation function f, including generating at least a threshold value L special elements distributed throughout elements of the permutation cycle.

8. The method of claim 7, further comprising:
    generating an additional shortcuts in the permutation cycle for any sequence of elements of the permutation cycle that does not have a special element and that is longer than a predetermined threshold value S.

9. The method of claim 1, further comprising:
    receiving a database query; and
    determining the target search value based on the database query.

10. The method of claim 1, further comprising:
    maintaining a conversion table between original column values and encoded column values.

11. The method of claim 1, wherein original column values in the database column are encoded as encoded values of a permutation cycle.

12. The method of claim 1, wherein the permutation function f is chosen randomly from a set of candidate permutation functions.

13. The method of claim 1, further comprising retrieving, from the database, an entire row having an encoded column value matching the initial candidate row number.

14. A system for database indexing, the system comprising:
    one or more computers and one or more storage devices storing instructions that are operable, when executed by the one or more computers, to cause the one or more computers to perform operations comprising:
        determining a row number in a database of a row that has a column that contains a target search value, wherein the target search value comprises a search value being sought in the database column, comprising:
            determining an initial candidate row number from the target search value,
            iteratively determining a subsequent candidate row number from a current candidate row number until the row of the database having the subsequent candidate row number has an encoded column value matching the initial candidate row number, including:
                determining whether an encoded column value in the current candidate row number of the database column corresponds to a special element of a plurality of special elements,
                if the encoded column value in the current candidate row number of the database column does not correspond to a special element, updating the current candidate row number by applying a permutation function f to the encoded column value in the current candidate row number in the database column, wherein the permutation function f converts row numbers to encoded column values, and
                if the encoded column value in the current candidate row number of the database column corresponds to a special element, updating the current candidate row number to a subsequent candidate row number associated with the special element instead of updating the current candidate row number using the permutation function f; and
            providing the subsequent candidate row number having the encoded column value matching the initial candidate row number.

15. The system of claim 14, wherein the permutation function f is an invertible function.

16. The system of claim 14, wherein determining the initial candidate row number comprises applying a function g to the target search value, wherein the function g converts target search values to initial candidate row numbers.

17. The system of claim 14, wherein applying the permutation function f to a row number generates a subsequent value of a permutation cycle.

18. The system of claim 14, wherein applying the permutation function f to a row number can be performed in memory without accessing other database content.

19. The system of claim 14, wherein the operations further comprise:
receiving a request for row information having the target search value; and
wherein providing the current candidate row number having the encoded column value matching the initial candidate row number is performed in response to receiving the request.

20. The system of claim 14, wherein the operations further comprise generating the special elements in a permutation cycle defined by the permutation function f, including generating at least a threshold value L special elements distributed throughout elements of the permutation cycle.

21. The system of claim 20, wherein the operations further comprise:
generating an additional shortcuts in the permutation cycle for any sequence of elements of the permutation cycle that does not have a special element and that is longer than a predetermined threshold value S.

22. The system of claim 14, wherein the operations further comprise:
receiving a database query; and
determining the target search value based on the database query.

23. The system of claim 14, wherein the operations further comprise maintaining a conversion table between original column values and encoded column values.

24. The system of claim 14, wherein the operations further comprise:
retrieving, from the database, an entire row having an encoded column value matching the initial candidate row number.

25. The system of claim 14, wherein original column values in the database column are encoded as encoded values of a permutation cycle.

26. The system of claim 14, wherein the permutation function f is chosen randomly from a set of candidate permutation functions.

27. A computer program product, encoded on one or more non-transitory computer storage media, comprising instructions that when executed by one or more computers cause the one or more computers to perform operations comprising:
determining a row number in a database of a row that has a column that contains a target search value, wherein the target search value comprises a search value being sought in the database column, comprising:
determining an initial candidate row number from the target search value,
iteratively determining a subsequent candidate row number from a current candidate row number until the row of the database having the subsequent candidate row number has an encoded column value matching the initial candidate row number, including:
determining whether an encoded column value in the current candidate row number of the database column corresponds to a special element of a plurality of special elements,
if the encoded column value in the current candidate row number of the database column does not correspond to a special element, updating the current candidate row number by applying a permutation function f to the encoded column value in the current candidate row number in the database column, wherein the permutation function f converts row numbers to encoded column values, and
if the encoded column value in the current candidate row number of the database column corresponds to a special element, updating the current candidate row number to a subsequent candidate row number associated with the special element instead of updating the current candidate row number using the permutation function f; and
providing the subsequent candidate row number having the encoded column value matching the initial candidate row number.

28. The computer program product of claim 27, wherein the operations further comprise:
receiving a request for row information having the target search value; and
wherein providing the current candidate row number having the encoded column value matching the initial candidate row number is performed in response to receiving the request.

29. The computer program product of claim 27, wherein the permutation function f is an invertible function.

30. The computer program product of claim 27, wherein determining the initial candidate row number comprises applying a function g to the target search value, wherein the function g converts target search values to initial candidate row numbers.

31. The computer program product of claim 27, wherein applying the permutation function f to a row number generates a subsequent value of a permutation cycle.

32. The computer program product of claim 27, wherein applying the permutation function f to a row number can be performed in memory without accessing other database content.

33. The computer program product of claim 27, wherein the operations further comprise generating the special elements in a permutation cycle defined by the permutation function f, including generating at least a threshold value L special elements distributed throughout elements of the permutation cycle.

34. The computer program product of claim 27, wherein the operations further comprise:
generating an additional shortcuts in the permutation cycle for any sequence of elements of the permutation cycle that does not have a special element and that is longer than a predetermined threshold value S.

35. The computer program product of claim 27, wherein the operations further comprise:
receiving a database query; and
determining the target search value based on the database query.

36. The computer program product of claim 27, wherein the operations further comprise maintaining a conversion table between original column values and encoded column values.

37. The computer program product of claim 27, wherein the operations further comprise:
retrieving, from the database, an entire row having an encoded column value matching the initial candidate row number.

38. The computer program product of claim 27, wherein original column values in the database column are encoded as encoded values of a permutation cycle.

39. The computer program product of claim 27, wherein the permutation function f is chosen randomly from a set of candidate permutation functions.

* * * * *